United States Patent
Barker et al.

(10) Patent No.: US 6,816,707 B1
(45) Date of Patent: Nov. 9, 2004

(54) DEBITING DEVICE FOR DEDUCTING TOLLS

(75) Inventors: Ronald Barker, München (DE); Günther Weber, München (DE); Bernd Grün, Gräfelfing (DE); Andreas Widl, München (DE)

(73) Assignee: Vodafone Holding GmbH, Düsseldorf (DE)

( * ) Notice: Subject to any disclaimer, the term of this patent is extended or adjusted under 35 U.S.C. 154(b) by 0 days.

(21) Appl. No.: 09/763,004

(22) PCT Filed: Aug. 6, 1999

(86) PCT No.: PCT/DE99/02502

§ 371 (c)(1),
(2), (4) Date: Feb. 12, 2001

(87) PCT Pub. No.: WO00/10133

PCT Pub. Date: Feb. 24, 2000

(30) Foreign Application Priority Data

Aug. 12, 1998 (DE) .......................... 198 37 488

(51) Int. Cl.⁷ .............................. H04B 7/00; H04Q 7/20; G08G 1/00
(52) U.S. Cl. ................ 455/41.2; 455/456.3; 455/456.1; 455/406; 455/405; 455/456.6; 340/928; 340/933; 340/988
(58) Field of Search .............................. 455/405, 456.1, 455/456.3, 456.6, 66.1, 74, 517, 406, 41.2; 340/928, 988, 933

(56) References Cited

U.S. PATENT DOCUMENTS

| | | | | |
|---|---|---|---|---|
| 5,530,702 A | * | 6/1996 | Palmer et al. | 370/85.3 |
| 5,721,678 A | | 2/1998 | Widl | |
| 5,767,505 A | * | 6/1998 | Mertens et al. | 235/615 |
| 6,073,062 A | * | 6/2000 | Hoshino et al. | 701/3 |
| 6,122,506 A | * | 9/2000 | Lau et al. | 455/427 |

* cited by examiner

*Primary Examiner*—Vivian Chin
*Assistant Examiner*—Eugene Yun
(74) *Attorney, Agent, or Firm*—Cohen, Pontani, Lieberman & Pavane

(57) ABSTRACT

The invention relates to a debiting device, which is arranged in a vehicle to deduct such tolls as are payable for the utilization of those road sections that are chargeable within a road network, and which comprises the following device modules permanently installed in the vehicle:

vehicle box (1)
external communications module (2) and
holding module (3)
and a mobile, electronic, toll device (4), which can be inserted into said holding module (3) and which can be easily removed again from the same.

14 Claims, 2 Drawing Sheets

DEBITING DEVICE FOR DEDUCTING TOLLS

This application is a 371 of PCT/DE99/02502 Aug. 6, 1999.

BACKGROUND OF THE INVENTION

1. Field of the Invention

The invention relates to a debiting device, which is arranged in a vehicle and used to deduct such tolls as are payable for the utilization of those road sections that are chargeable within a road network.

2. Description of the Related Art

EP 0 691 013 B1 to which U.S. Pat. No. 5,721,678 corresponds, whose contents are incorporated by reference in the present application, describes a utilization charging system, in which the tolls that are payable in respect of road utilization by a vehicle are deducted anonymously within the vehicle itself. A debiting device is installed in the vehicle for this purpose, and debits the charge from a storage module, which contains credits in the same way as a telephone card, for example. The storage module is designed as a chip card, for example, and can be loaded with further credits, as required, in a suitable automatic machine by paying an appropriate sum of money. In order to calculate the amounts to be debited each time the vehicle uses a chargeable road section, the debiting device has access to both tariff data and geographical data relating to the chargeable road network. The device is also equipped with a receiver (GPS receiver) for receiving signals from a navigation satellite system, so that it can accurately determine the sections covered by the vehicle on chargeable roads, and therefore calculate the exact tolls that are payable.

Acceptance of such a toll charging system is dependent on a guarantee of maximum security against tampering. EP 0 701 722 B1 to which WO 94/28510 designating the U.S. corresponds, whose contents are incorporated by reference in the present application, proposes for this purpose a debiting device that, in addition to including a GPS receiver, a computer device to identify the chargeable road sections used by the vehicle in each case, and a storage module to record the tolls (chip card), also has equipment to perform self-monitoring in respect of unauthorized tampering with individual device components. The device also has an error memory to record diagnostic data in the event of unauthorized tampering, and a signaling device that transmits a signal to indicate whether the device is functioning correctly. As soon as the device's self-monitoring facility detects unauthorized tampering, the remaining device functions are automatically and immediately locked, so that the device becomes unusable from that moment.

Despite the inclusion of these security mechanisms, there is a requirement for additional or alternative security mechanisms, and particularly less expensive mechanisms, to protect against the unauthorized use of such a debiting device. It is also particularly important to protect users of the chargeable road network against unauthorized use of the credits purchased by them to use the road network. It would be relatively easy for a simple memory card to fall into the hands of an unauthorized user and exploited at the expense of the legitimate owner.

The article entitled "Gebühren erfassen aus lüftiger Höhe" [GPS-based charge recording] in the publication entitled Design & Elektronik (November 1996) specifies that only the general functions of a toll device can be derived from GPS facilities. There is no reference to the implementation of a mobile toll device. With regard to protection against tampering, the only reference is to detection of an invalid vehicle class.

DE 4427392 A1 describes a toll device that is installed in a vehicle and includes a removable read/write unit for smart cards. However, it does not refer to reciprocal authentication between the removable device unit and the device component that is fixed within the vehicle, based on a vehicle-specific certificate and a certificate for the mobile unit, nor is such authentication proposed as beneficial. With regard to detection of unauthorized use, it only refers to the utilization of certain road sections without sufficient credits to pay the toll, but not to the unauthorized use of the toll device itself. PIN input is only mentioned in the context of loading the credit card via radio link.

CH 687 352 A5 describes a toll device with GPS functionality, in which a device unit referred to as a data switch unit is designed as a mobile unit, and can therefore be removed from the vehicle. In one implementation of this toll device, it is proposed that an identification code of the data switch unit be compared to the vehicle identification, so that the assignment of the data switch unit to one or more vehicles can be electronically monitored, which is particularly important in determining that the data capture device is always used in the correct type of vehicle. This document does not make any reference to the use of a memory that can be externally loaded with credits and used to deduct tolls.

U.S. Pat. No. 5,465,207 describes a vehicle data system, which includes a device for capturing data in the context of utilization and operation of transport vehicles, where these vehicles are fitted with all manner of devices for the purpose of electronic data transfer. There are no references to the calculation of charges for the use of road sections in a chargeable road network.

SUMMARY OF THE INVENTION

The objective of the present invention is to provide a debiting device that guarantees maximum protection against misuse for both the operator and users of the toll charging system. In comparison with the potential for unauthorized use of a telephone card, this is of far greater significance since the value of credits purchased by the user will generally be far greater than those on a telephone card.

An important principle of the present invention is that a large part of the debiting device exists as a separate module in a mobile electronic toll device, which must be linked to modules that are permanently installed in the vehicle in order to obtain the full device functionality. These modules comprise a vehicle box, an external communications module, and a holding module to accommodate the mobile toll device. At the same time, both the vehicle box and the mobile toll device should have their own device certificate, and authenticate each other reciprocally. This prevents the use of e.g. a stolen mobile toll device in any other vehicle with a (non-compatible) vehicle box, in order to illegitimately use the remaining credits in the credit memory of the mobile toll device. Furthermore, the external communication facilities allow the credit memory to be loaded without the need to remove the memory itself from the device. Instead, the complete mobile unit of the toll device can be instructed to exchange data with a suitable automatic machine in order to load credits. In this case, the mobile toll device is simply placed in the vicinity of the automatic machine, for example, and the required data transfer can be performed using DSRC (dedicated short-range communication), for example. The memory holding the credits can therefore be an integral part of the mobile toll device, and could not be used by an unauthorized user without the valid vehicle box for the toll device, since it could not be authenticated.

Reciprocal authentication between the mobile toll device and the vehicle box, without which the debiting device cannot function, is a particular and significant characteristic of the present invention, since it ensures almost total protection against misuse. The level of protection offered is considerably better than can be achieved with simple identification of device modules. Simple identification only provides partial protection, since one device module only compares the device identification code received from the other device module (the one to be checked) with an individual device identification code or a list of authorized device identification codes. In other words, it only refers to specific memory information stored in the device module in each case. In principle, however, such information is susceptible to tampering.

By comparison, reciprocal authentication by device modules, each of which has its own device certificate, is considerably more secure. This is because the check performed in each case is designed to establish whether the other device module is in possession of a secret. The actual contents of the secret are not transmitted during data transfer between the device modules, nor are they stored within the checking device module. Consequently this secret, which is generated by an authority that cannot be influenced by the device user (e.g. a trust center), cannot be reconstructed by an unauthorized user or therefore tampered with.

DETAILED DESCRIPTION OF THE PRESENTLY PREFERRED EMBODIMENTS

Figure 1:
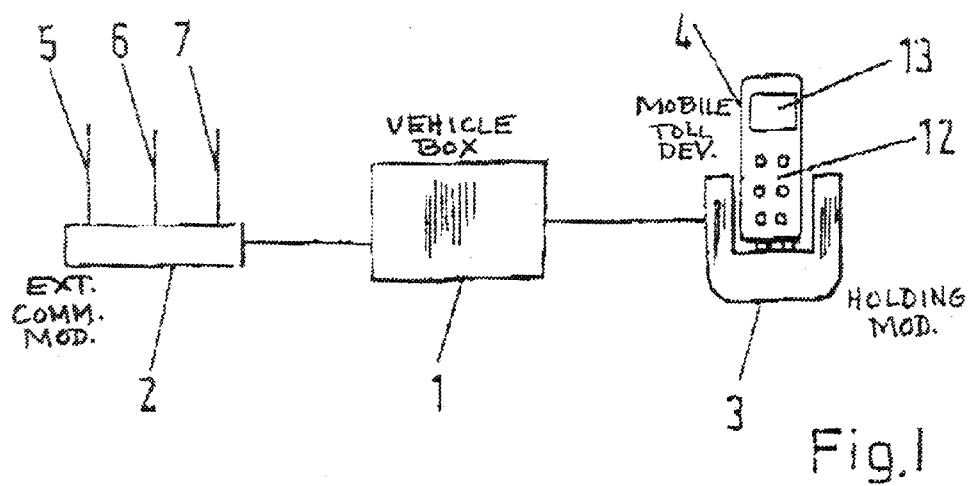
FIG. 1: A schematic diagram of the inventive debiting device

As shown in FIG. 1, the inventive debiting device comprises four device modules, which are described in greater detail below. Three of these modules, namely the vehicle box (1), the external communications module (2), and the holding module (3), are permanently installed in the vehicle. The fourth module is a mobile electronic toll device (4), which can be inserted into the holding module (3) and which can be easily removed again from the same. Although these are not shown in more detail in FIG. 1, the vehicle box (1) includes a power supply unit, a tamper-protected memory module for vehicle-specific information, and an interface for inter-communication with the mobile toll device (4). Vehicle-specific information held in the memory module relates to the vehicle type, vehicle class, chassis number, or even the name of the company that owns the vehicle, for example. A vehicle-specific device certificate is stored in the memory module in each case. Ideally, all the information stored in memory should be held in encrypted format, and should only be modifiable by an authorized authority (e.g. technical supervisory group). This effectively guards against unauthorized tampering. The vehicle-specific information provides the relevant parameters for selecting the correct tariff when charging tolls, for example. In addition, the vehicle box (1) should preferably have an interface for picking up current operating data from the vehicle, e.g. from an electronic information bus in the vehicle (e.g. CAN-Bus) or from sensors or measuring equipment in the vehicle. This would make it possible, for example, to charge tolls on the basis of emissions, with emission values being ascertained via the lambda probe of the combustion engine. The capture of current operating data can also be extremely useful with regard to overcoming faults in the receipt of GPS satellite signals, which are required to determine the chargeable road sections used by the vehicle. For example, speed and time data, or distance logs can be used as reference values in the analysis of route sections based on "dead reckoning". If there is no direct signal connection between the external communication module (2) and the holding module (3), then there is an interface between the vehicle box (1) and the external communication module (2) to carry the signal flow.

The external communication module (2), which has a signal connection to the vehicle box (1), includes one antenna (5) for receiving GPS satellite signals (or similar incoming wireless navigation signals), and one antenna (6) for DSRC communication and/or one antenna (7) for GSM communication (or similar mobile radio technology). The DSRC antenna (6) allows short-range communication in the HF or infrared ranges, for example. The most suitable location for the antennas, which can be installed individually or as a combined unit, is on the outside of the vehicle passenger cell, since the increasing use of metallized windscreens leads to an increased absorption of HF signals. The antennas (5, 6, 7) and the vehicle box (1) are connected together via shielded signal lines (e.g. electrical or fiber-optic lines). Ideally, the DSRC antenna (6) should be implemented as a phased-array antenna, and structurally combined with the GPS antenna (5) and/or the GSM antenna (7). An advantageous position for a combined or integrated antenna is on the vehicle roof, just behind the windscreen.

Due to the signal-attenuating effect of the windscreen and the shielding effect of the vehicle roof, the antennas (5, 6, 7) of the GPS receiver, the DSRC equipment, and the GSM mobile radio device should preferably be located on the outside of the vehicle. However, the ducting of antenna cables from the interior to the exterior of an existing vehicle is both labor-intensive and expensive, and upgrading a vehicle to include the debiting device would therefore incur significant installation costs. In order to reduce these costs drastically, it is recommended that the antennas (5, 6, 7) or integrated antenna (GSM/GPS/DSRC) be adhered to the outside of the windscreen as a passive component. The power supply and the signal connection can be provided using either inductive or capacitive methods by an appropriate communication device that is adhered to the inside of the vehicle, and from which the cables (power supply and signal line) are ducted to the vehicle box (1). This eliminates the need to pierce the outer skin of the vehicle. A reduction in the cost of installation and increased protection against eavesdropping can be achieved by separating the power supply and signal transmission functions, for example by implementing an induction loop on the interior and the exterior of the windscreen or rear window in each case. Alternatively, signal transmission could be optical rather than electrical, using laser and photodiodes for example. In this case, a matrix of laser and photodiodes could increase the data transmission speed and protection against eavesdropping. Signal conversion from "electrical" to "optical" would be necessary for optical data transmission through the windscreen, and this would take place in the antenna housing.

The holding module (3) is connected to the vehicle box (1) and the external communication module (2) for signaling purposes. It includes mechanical fittings to accommodate the mobile toll device (4), equipment for the mobile toll device (4) to exchange signals with the external communication module (2) and the vehicle box (1), and a power supply for the mobile toll device (4). In principle, the holding module (3) performs the same function as a vehicle holding unit for a mobile radio phone. It allows the mobile toll device (4) to be removed easily from the vehicle as necessary, or connected to the vehicle for functional purposes.

Figure 2:
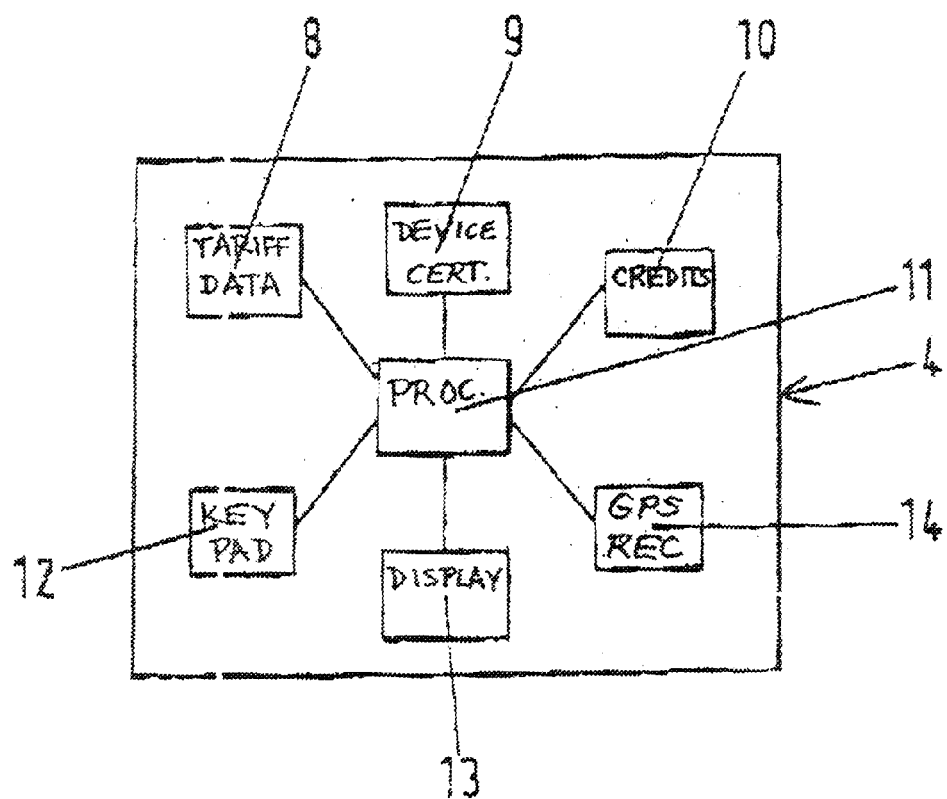
FIG. 2: A schematic diagram of a mobile toll device

The mobile toll device (4) contains the actual heart of the inventive debiting device. Its details are shown in the schematic diagram at FIG. 2. The mobile toll device (4) includes a GPS receiver (14) to determine the current geographical position of the vehicle, together with a number of data memory modules, including a memory (8) for tariff data and geographical data relating to the chargeable road network, a memory (9) for a device certificate for the mobile toll device (4), and a memory (10) that can be loaded externally with credits for the electronic processing of payment transactions between the user of the debiting device and the recipient of the tolls. The mobile toll device (4) also includes a processor (11) to calculate tolls and perform reciprocal authentication for the mobile toll device (4) and the vehicle box (1), a keypad (12) to operate the device, and a display unit (13) to show the device status and accounting information. The data returned by the GPS receiver (14) about the current geographical position of the vehicle at any time enables the processor (11) to examine the road sections covered by the vehicle, and determine whether and to what extent chargeable road sections were used, so that an appropriate charge can be applied. The tariff data and geographical data relating to the road network and stored in the memory (8) are required for this purpose. For the purposes of this invention, the memory (8) should be divided into a read-only memory (ROM) and a read/write memory (RAM). The ROM is used as a permanent storage area for the original data that was valid at a specific time. The RAM is used to record update data. For reasons of security, it is preferable to store the update data in such a format that the current tariff data can only be derived from this update data by also referring to the tariff data that was originally stored in the ROM. For example, the update data could be stored in the form of a percentage change increase. This would introduce an additional obstacle to unauthorized tampering. The memory (9) with the device certificate for the mobile toll device (4) provides a facility for reciprocal authentication between the mobile toll device (4) and the vehicle box (1), and therefore prevents the use of a mobile toll device (4) that does not match the vehicle box (1). Ideally, the memory (9) should be designed as a chip card, and preferably a chip card that is permanently integrated in the mobile toll device (4). The latter offers particularly effective protection against unauthorized tampering. A corresponding memory design is also recommended for the memory (10) that is used for electronic processing of the payment transactions between the user of the debiting device and the recipient of the tolls. This memory (10) contains the credits, from which are debited the amounts payable in each case for the chargeable road sections. Ideally, this memory (10) should be designed as a radio chip card (contactless card), and integrated in the mobile toll device as a sealed unit. Since such a memory (10) does not have any externally accessible contacts, it is possible to virtually rule out the sort of tampering that is known to have occurred frequently in the case of telephone cards using a PC and the appropriate card read/write equipment. It is recommended that the memories (8, 9, 10) of the mobile toll device (4) be physically combined in a common memory module. The processor (11) performs all the check procedures for reciprocal authentication of the mobile toll device (4) and the vehicle box (1), and performs the calculation procedures required to determine the relevant tolls in the prescribed manner. Therefore as well as identifying the road sections that have just been covered by the vehicle, it also ascertains the relevant tariff required to determine the appropriate charge. The keypad (12) is primarily used to switch the debiting device on and off, and to call up the remaining credits held in the memory (10) at any time. The keypad (12) can also be used to set the relevant tariff class, for example. As with a mobile radio phone, a display unit (13) can also be used to view the device status, the credit balance, and other accounting information. A liquid-crystal display is the most suitable design format for this display unit (13).

To increase the level of protection against tampering, it is recommended that the functions of the GPS receiver (14), the DSRC and/or GSM communication, the memory controllers for the memories (8, 9, 10), and the processor (11) be physically combined in a highly integrated, electronic ASIC (application-specific integrated circuit), with a dedicated bus for internal communication. In particular, it is recommended that all external communication with this highly integrated circuit be memory mapped and/or conducted via a parallel interface. In the case of a highly integrated solution, the mobile toll device (4) has a so-called "hardened kernel". This offers maximum protection for the device integrity. In order to provide sample-based or continuous monitoring of toll-charging accuracy, it is recommended that the processor (11) be programmed in such a way that information about the correct operation of the debiting device can be requested externally using wireless channels via the external communication module (2). In this way, it would be possible to detect tampering with the tariff structure or the selection of an unsuitable tariff by the user, for example.

By using highly integrated electronic components, it is possible to ensure that the overall structural dimensions of the debiting device remain relatively small. It is therefore possible to design the debiting device as part of an electronic tachograph, for example. In particular, it would be possible to include the modules of a mobile radio phone or a traffic-communications terminal (e.g. power supply, antennas) in the debiting device, and therefore to use these modules jointly for several applications, or to install modules of the debiting device together with modules of a mobile phone or traffic-communications terminal in the vehicle.

It is particularly advantageous if the design of the debiting-device electronics is open to further applications, so that additional software applications can be loaded externally in the form of modules at a later stage. Ideally, such applications would relate to the field of traffic communications.

The function of the inventive debiting device can be described as follows: A user takes the mobile toll device (4) to an external POS (point-of-sale) terminal provided by the operator of the chargeable road network, in order to purchase credits for use of the chargeable road network with cash or a credit card. In the case of HF communication, the data transfer required to load the credits could take place directly between the POS terminal and a radio chip card in the mobile toll device (4). For the purposes of the invention, this communication should take place in accordance with standardized and certified procedures for electronic payment transactions. Data transfer could also be implemented by means of an infrared interface. A standard electrical interface to the radio chip card is provided for the internal debiting of credits.

Credits can also be loaded into the memory (10) in the conventional way at the POS terminal via an electrical interface on the mobile toll device (4). In this case, the device certificate in the memory (9) can provide an extremely high level of security against unauthorized tampering, since authentication takes place between the toll device (4) and the POS terminal before the credits are transferred. If a PC rather than a POS terminal is connected to the mobile toll device (4), in an attempt to tamper with the system, the mobile toll device (4) could detect this. With the appropriate programming, the toll device could immediately trigger a permanent device lock, which could only be canceled by an authorized authority.

In principle, it would also be possible to send the credits like a telephone transmission from the POS terminal directly to the mobile toll device (4), which would then require a corresponding address. In this case, there would be no need at all for physical proximity between the mobile toll device and the POS terminal. The electrical energy required for the loading process could be provided in the same way as for a mobile radio phone, for example, via a rechargeable electric battery that can be recharged in the vehicle.

Once the memory (10) has been loaded with the credits, the mobile toll device (4) can be placed in the vehicle's holding module (3). A soon as the device is inserted into the holding module, the authentication procedure between the vehicle box (1) and the mobile toll device (4) begins, and is performed by the processor (11). The debiting device only becomes operational if the authentication procedure is successful. In the context of authentication, there is no reason why a specific vehicle box (1) should only accept a single mobile toll device (4) as suitable. In the case of large haulage companies, it can be very advantageous if all a company's toll devices are accepted by all the vehicle boxes of the same company. In this case, it is only necessary to have as many mobile toll devices (4) as there are company vehicles on chargeable road sections. The authentication function prevents their unauthorized use in vehicles other than those of the company fleet. Since the processor (11) can interrogate vehicle-specific data from the vehicle box (1) as part of the authentication process, the processor (11) can also independently configure the mobile toll device (4) for the relevant vehicle class, so that the correct tariff class is used to calculate charges. When a vehicle that is fitted with a correctly operating debiting device enters a chargeable road section, this is automatically detected by the processor (11). Depending on the tariff and the road section covered, the charges payable are then continuously debited from the credits in the memory (10) during the journey. Ideally, this information would be shown on the display unit (13). The debiting transactions terminate as soon as the vehicle leaves the chargeable road network.

In principle, the same inventive debiting device can calculate utilization charges for different road network operators, whose chargeable road networks are consecutively used by the vehicle concerned. In this case, the memory (10) can be configured to process payment transactions based on a number of accounts, where each account is allocated to a specific operator. The amounts deducted from the credit balance are then credited to the accounts of the individual operators in accordance with actual utilization of the road networks concerned. Various methods can be used to output information to an accounting office, relating to the amounts allocated to the different operators, in order to control the actual outflow of money. For example, the next time credits are loaded at a POS terminal, the different accounts corresponding to the expenditure of the previous credit balance could be read from the memory (10), albeit retrospectively. Alternatively, this information could be sent directly from the vehicle to the appropriate external accounting office on a continuous basis via GSM communication, for example.

The inventive debiting device is suitable for use in both commercial and private vehicles. It offers operators of chargeable road networks a high level of protection against all types of unauthorized tampering, and offers the user a high level of protection against unauthorized use of credits that have been purchased, since it ensures that the mobile toll device, from which it is practically impossible to separate the credits, can only be used in "authorized" vehicles.

What is claimed is:

1. A debiting device that is arranged in a vehicle and used to deduct such tolls as are payable for the utilization of those road sections that are chargeable within a road network, and which comprises a vehicle box, an external communications module, and a holding module which are permanently installed in the vehicle, and a mobile electronic toll device, which can be inserted into said holding module and which can be easily removed again from the holding module;

the vehicle box comprising a power supply unit, a tamper-protected memory module for vehicle-specific information, including a vehicle-specific device certificate, and an interface for inter-communication with the mobile toll device;

the external communication module comprising an antenna for receiving GPS satellite signals and at least one antenna for at least one of DSRC and GSM communication;

the holding module being connected to the vehicle box and the external communication module for signaling purposes and comprising mechanical fittings to accommodate the mobile toll device, equipment for the mobile toll device to exchange signals with the external communication module and the vehicle box, and a power supply for the mobile toll device; and the mobile toll device comprising a GPS receiver to determine the current geographical position of the vehicle, a memory for tariff data and geographical data relating to the chargeable road network, a memory for a device certificate for the mobile toll device, a memory that can be loaded externally with credits for electronic processing of payment transactions between a user of the debiting device and a recipient of the tolls, a processor to calculate tolls and perform reciprocal authentication for the mobile toll device and the vehicle box, a keypad to operate the device, and a display unit to show the device status and accounting information.

2. The debiting device as claimed in claim 1, wherein the information in the memory module in the vehicle box is encrypted for storage.

3. The debiting device as claimed in claim 1, wherein the vehicle box has an interface for picking up current vehicle operating information from an information bus or from sensors or measuring equipment in the vehicle.

4. The debiting device as claims in claim 1, wherein the memory for tariff data and geographical data is divided into a read-only memory (ROM) and a read/write memory (RAM) to record update data, wherein current tariff data can only be derived by referring to the tariff data in the ROM.

5. The debiting device as claimed in claim 1, wherein at least one of the memory for the device certificate and the memory with credits for electronic processing of payment transactions is a fixed chip card that is integrated in the mobile toll device.

6. The debiting device as claimed in claim 1, wherein the individual memories of the mobile toll device are combined into a common memory module.

7. The debiting device as claimed in claim 1, wherein the memory for payment transactions is designed as a radio chip card (contactless card).

8. The debiting device as claimed in claim 1, wherein the functions of the GPS receiver, the at least one of DSRC and GSM communication, controllers for the memories, and the processor are physically combined in a highly integrated electronic ASIC (application-specific integrated circuit).

9. The debiting device as claimed in claim 8, wherein exclusively parallel interfaces are used for communication with the highly-integrated circuit.

10. The debiting device as claimed in claim 8, wherein a so-called "hardened kernel" is used for operation of the mobile toll device.

11. The debiting device as claimed in claim 1, wherein the debiting device is part of an electronic tachograph.

12. The debiting device as claimed in claim 1, wherein the debiting device includes the modules of a mobile radio phone or a traffic-communications terminal, or is installed together with modules of a mobile phone or traffic-communications terminal in the vehicle.

13. The debiting device as claimed in claim 1, wherein the design of the debiting-device electronics is open to further applications, so that additional software applications for traffic communications can be loaded externally in the form of modules at a later stage.

14. The debiting device as claimed in claim 1, wherein information about the correct operation of the debiting device can be requested externally via the external communication module.

* * * * *